RETAINER VALVE

Original Filed Dec. 27, 1967 3 Sheets-Sheet 1

INVENTOR.
HENRY R. BILLETER

BY

PARKER & CARTER

ATTORNEYS

RETAINER VALVE

Original Filed Dec. 27, 1967 3 Sheets-Sheet 2

INVENTOR.
HENRY R. BILLETER

BY

PARKER & CARTER

ATTORNEYS

INVENTOR.
HENRY R. BILLETER
BY
PARKER & CARTER
ATTORNEYS

United States Patent Office

Re. 27,514
Reissued Oct. 24, 1972

27,514
RETAINER VALVE

Henry R. Billeter, Deerfield, Ill., assignor to Sloan Valve Company, Chicago, Ill.

Original No. 3,526,248, dated Sept. 1, 1970, Ser. No. 693,801, Dec. 27, 1967. Application for reissue Mar. 22, 1971, Ser. No. 126,624
Int. Cl. F16k *11/00;* B60t *15/54*
U.S. Cl. 137—599.2 18 Claims

Matter enclosed in heavy brackets [ ] appears in the original patent but forms no part of this reissue specification; matter printed in italics indicates the additions made by reissue.

ABSTRACT OF THE DISCLOSURE

This retainer valve has a sleeve valve rotated by a handle to three different positions. A tubular bushing around the sleeve valve has three air ports, each of different capacity, which are adapted to communicate with air ports in the sleeve valve and these with an exhaust opening in the valve body. A piston in the sleeve valve controls one of the air ports. An oblique O-ring seal in the tubular bushing seals the different ports from the exhaust passage in the different handle positions. In one position full air exhaust is provided from the air brake pipe. In the second position 20 p.s.i. is retained by the piston control; while in the third position a slow restricted exhaust is provided.

BACKGROUND OF THE INVENTION

In operating freight trains over long descending grades it is common practice to retain a light brake application at all times. It is also desirable however that the train braking system be kept completely charged during this cycling of the brakes. To provide these features retainer valves are provided on each railroad car which function when set, to retain a chosen air pressure within the brake cylinder at all times. This air charge is retained even though the AB control valves are in the release position. These retainer valves are usually located on the end wall of a freight car adjacent the hand brake.

DESCRIPTION OF THE PRIOR ART

Retainer valves as formerly constructed had irregular shaped bodies and several spring pressed valves controlling various size air ports, together with an operating handle having a valve member with different ports adapted to be placed in communication with the several valves. This construction was difficult to service and maintain, was costly to produce and often unreliable in operation. This construction also was conducive to leakage through the various valve seats since no reliable air seals were employed to compensate for wear and vibration during train movements.

The principal object of the invention is, therefore, to design an improved retainer valve that is much simpler in construction, is less costly to manufacture, requires considerably less servicing and maintenance, is reliable and positive in operation, and is leakproof.

DESCRIPTION OF THE DRAWINGS

FIG. 10 is a top view of the retainer valve with its cover and operating handle removed; while

DESCRIPTION OF THE PREFERRED EMBODIMENT

Figure 2:
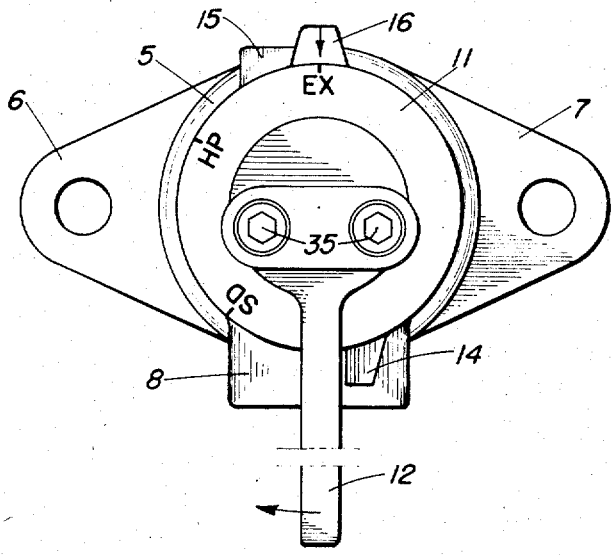
FIG. 2 is a full-size top view of the valve.
Figure 1:
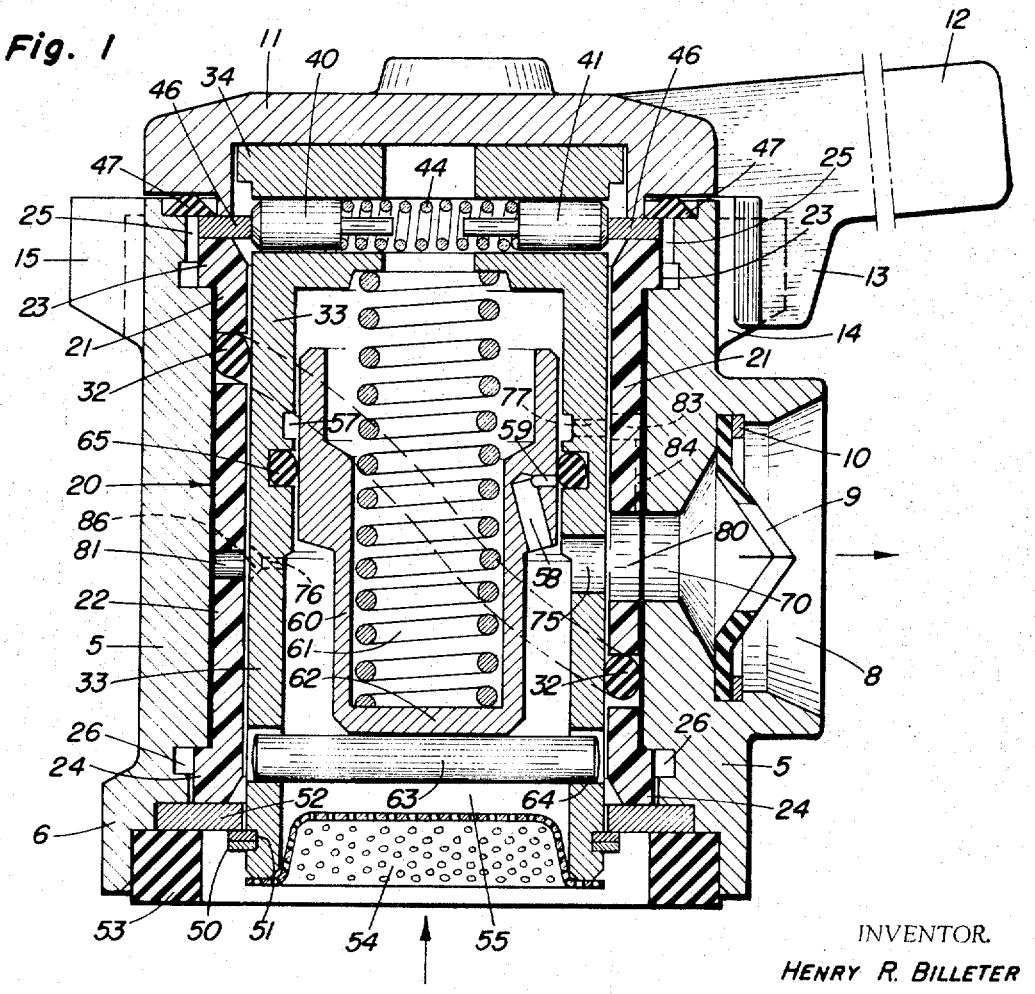
FIG. 1 is a cross-sectional side view of the retainer valve of the invention shown in large scale.

Referring now to the drawings, FIGS. 1 and 2, the retainer valve comprises a hollow cylindrical-shaped body 5 of brass having supporting flanges 6 and 7 on the bottom end for suitably mounting the device, as by bolts, upon a retaining valve mounting bracket on the end wall of a freight car or other type of railroad car. On the side wall of the body 5, there is an air exhaust opening 8 provided, which air opening is protected from entry of insects and dirt by a rubber disc 9, centrally slitted so that internal air pressure will force open the slits to permit air to exhaust from the opening. The rubber disc 9 is held in place in the opening 8 by a snap ring 10.

The top end of the body 5 is enclosed by a rotatable cover plate 11, having a manually operable depending handle 12 formed integral therewith, so that the cover plate 11 is rotated whenever the handle 12 is actuated in a clockwise direction. The rotation of the handle 11 is limited for movement in one direction by a lug 13 formed on the bottom of the handle engaging a similar lug 14 formed on the bottom of the body 5. Another lug 15 formed on the top side of the body limits movement of the handle in the other direction. The handle 12 is adapted to be rotated and frictionally locked into each of three different positions. A third lug 16, formed on the top of the body 5, serves as an indicia for the different handle positions, designated as EX, HP and SD, on the cover, the purpose of which will be hereinafter explained.

Figure 3:
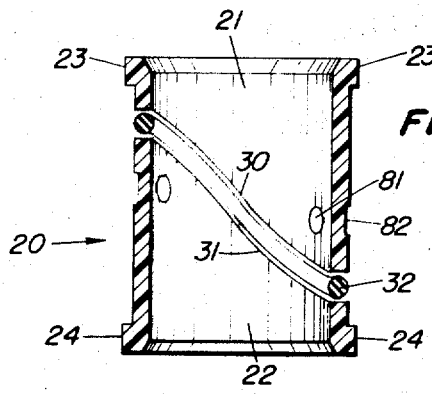
FIG. 3 is a cross-sectional side view of the two-section tubular bushing and sealing ring.
Figure 4:
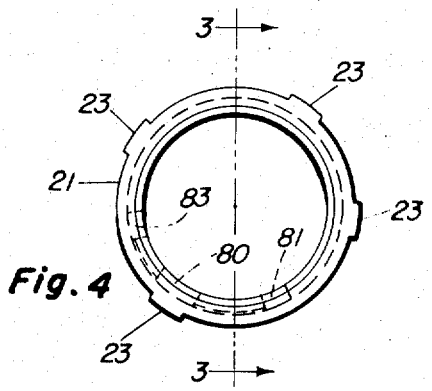
FIG. 4 is a top view of one of the tubular bushings.

Within the hollow body 5, there is arranged a two-part tubular bushing generally designated at 20 and preferably made of a plastic material such as polycarbonate and trade marked Noryl. The bushing 20 is molded of two identical parts, one of which 21, is inserted from the top end of the hollow body 5, and the other 22, from the bottom end. At the outer ends of each bushing part, a series of one or more spaced lugs are formed, such as 23 on bushing 21, and lugs 24 on bushing 22. These lugs are set in recesses such as 25 and 26, formed on each end of the body 5, and are for the purpose of preventing rotation of the tubular bushing 20 within the body. The lugs and recesses are spaced unequally around the edge of the bushings 21 and 22, so that the bushings can only be inserted into the body in one positive position. The inner edges 30 and 31 of busings 21 and 22, as seen in FIG. 3, are formed at a diagonal angle as shown, and between these edges 30 and 31, a sealing ring such as O-ring 32 is placed conforming to the general contour of the two diagonal or oblique edges of the two tubular bushings. The O-ring 32 fits between the two diagonal surfaces 30 and 31 when the two busings 21 and 22 are assembled together in position in the body 5. The sealing ring 32 has interference or close fit between the body 5 and the sleeve 33, thus preventing leakage past the sealing ring. In FIG. 3 these parts are all shown slightly spaced apart for the sake of clarity.

Figure 6:
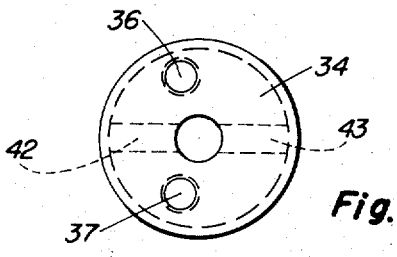
FIG. 6 is a top view of the sleeve valve.
Figure 9:
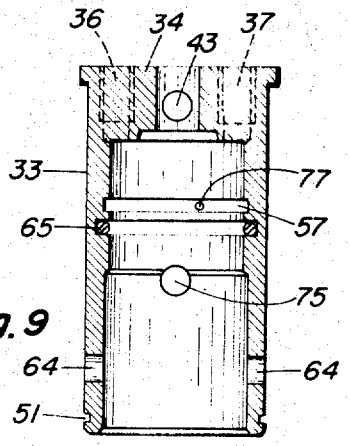
FIG. 9 is a cross-sectional side view of the sleeve valve taken along the line 9—9 of FIG. 8.

A hollow sleeve valve member 33, preferably made of brass, is inserted and arranged within the tubular sleeve 20 for rotary movement therein. The top end 34 of the sleeve valve 33 is attached to the cover plate 11 by a pair of recessed bolts 35 located and threaded off-center into the top of the sleeve valve 33 in tapped holes 36 and 37, as best seen in FIGS. 6 and 9. It will therefore be apparent from the above that whenever the handle 12 is actuated clockwise, the cover plate 11, as well as the sleeve valve 33, will be rotated as a unit. The operating handle 12 is adapted to control the rotation of the sleeve valve 33 into three separate positions. In the first and normal position with the handle hanging downward as shown in FIG. 2, a direct exhaust (EX) is provided through the valve; in the second position a high pressure air retaining (HP) condition is provided; and in the third position a slow direct exhaust (SD) is provided. The exhaust opening 8 is positioned downward to help prevent entrance of dirt outside the flexible disc 9.

Figure 10:
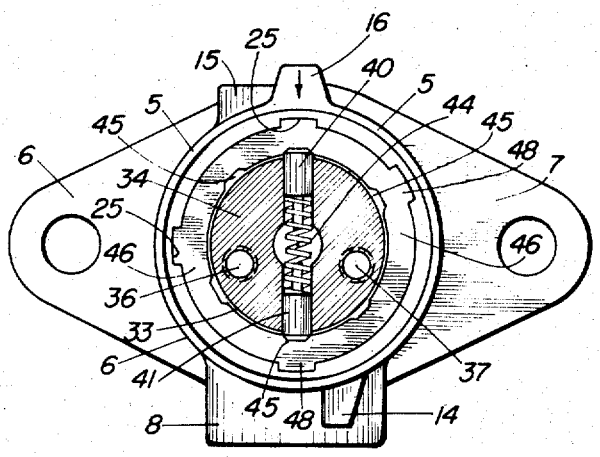

In order to insure that the handle 12 and sleeve valve 33 remain in their set positions and are not dislodged during movements and vibrations of the railroad car, the handle 12 is frictionally locked in each of the adjusted positions. This locking means consists preferably of a pair of locking pins 40 and 41, slidably arranged in bores 42 and 43 at the top end 34 of the sleeve valve 33. Between the pins 40 and 41, there is a spring 44, normally urging the pins apart, as best seen in FIG. 10. The outward ends of pins 40 and 41 are slightly tapered and are adapted to snap into and engage oppositely arranged recesses 45, formed in the inner edges of a ring 46, thereby preventing unintentional dislodgement of the retainer valve handle from its selected setting. The ring 46 has a series of lugs 48 formed around its periphery which fit into the slots 25 in the top of the body to prevent turning of the ring 46. A situable sealing gasket 47 is arranged on a ledge formed around the top end of the tubular bushing 20 and against which the cover plate 11 is pressed to seal off the top end of the body 5 for protection against weather and dirt.

In order to securely clamp the tubular bushing 20 and the sleeve valve 33 in the body 5, a snap ring 50 is arranged on the bottom end of these parts and rests in an annular groove 51 formed in sleeve valve 33. The snap ring 50 also presses up against a ring 52 recessed in the bottom end of the body 5, and this ring 52 in turn is clamped against the bottom end of tubular bushing 20, thereby holding all these elements in assembled relationship within the valve body. A circular gasket 53 on the bottom end of the retainer valve body provides an air seal against a suitable supporting bracket, not shown, to which the inlet air brake connection is made. The retainer valve is bolted to such bracket by the bolts in the holes in flanges 6 and 7. A dirt screen 54 is press-fitted across the air inlet at the bottom of the sleeve valve 33.

Axially slidable within the sleeve valve 33, is a hollow piston 60, having a spring 61 within it extending between the closed bottom end 62 of the piston and the top end of the sleeve valve 33. The bottom end 62 of the piston bears against a stop pin 63, extending through holes 64, on opposite sides of the sleeve valve 33. A sealing ring such as O-ring 65, recessed in a groove in sleeve valve 33, provides the air seal between the sides of the piston 60 and the sleeve valve 33.

Figure 7:
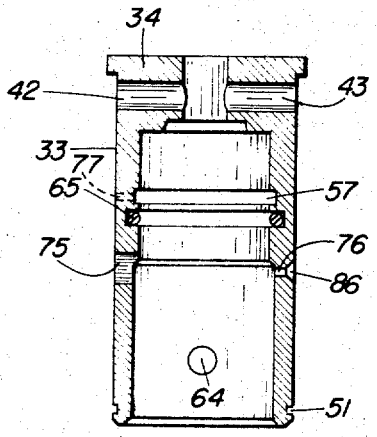
FIG. 7 is a cross-sectional side view of the sleeve valve taken along the line 7—7 of FIG. 8.
Figure 8:
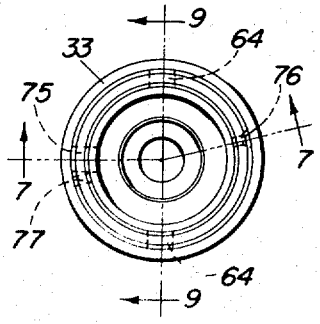
FIG. 8 is a bottom view of FIG. 7.

Both the sleeve valve 33 and the tubular bushing 20, each have ports or air passages of different diameters and capacity extending through their sides, which are adapted to be placed in communication with the main air exhaust opening 70 in the side of the valve body 5. The sleeve valve member 33 has three such ports, the exact locations of which are best seen in FIGS. 7, 8 and 9. The port 75 in sleeve valve 33 having the largest diameter, is located approximately midway of the length of the sleeve valve 33. Port 76 of a smaller diameter is located almost directly opposite the port 75, while port 77 of slightly greater diameter than port 76, is located to one side of and above the port 75. The specific location of the ports radially around the sleeve valve 33 is best seen in FIG. 8.

Figure 5:
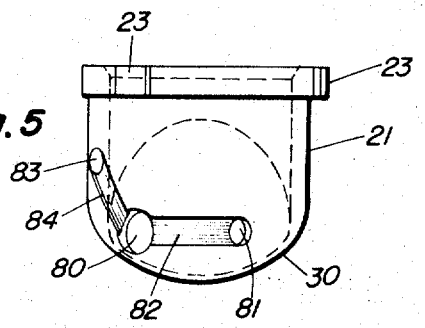
FIG. 5 is a side view of one of the tubular bushings.

Referring now to the ports in the tubular bushing 21, as best seen in FIG. 5, the largest port 80 is located directly in alignment with the air exhaust opening 70 in the valve body. A second port 81 in bushing 21 of smaller diameter is located in the same horizontal plane as port 80 and connected to it by a shallow slot 82 cut in the outside surface of the bushing 21. The third port 83, can be of the same size as port 81, and is located slightly above and to one side of the port 80. A shallow slot 84 connects port 83 with port 80. The other lower tubular bushing 22 of the two-part bushing 20 is made exactly the same as bushing 21 and has the identical ports and slots formed therein. The purpose of providing two identically formed tubular bushings 21 and 22, is so that these parts are interchangeable and in the assembly of the retainer valve it is immaterial whether the bushing 21 is placed on top or on the bottom side of the sealing O-ring 32, as is evident in FIG. 3. The ports in the bushing 22 located on the bottom for example, will be ineffective or substantially blocked out by the sealing O-ring 32 from communication with any of the ports in the sleeve valve 33 above the O-ring and out through the exhaust port 70, in each of the three handle portions, and are therefore ineffective. This is so because while it appears that leakage could occur between the relative contiguous surfaces between the sleeve valve 33 relative tubular bushing 20 below the O-ring 32 from the sleeve valve ports, the fact is that this apparent leakage takes place on the inlet side and is balanced and cannot take place on the downstream side and above the O-ring to the outlet 70.

The hollow piston 60 has an air passage 58 leading to a small port 59 in its side, which port is located below the sealing O-ring 65 in the normal position of the piston 60 as illustrated, the piston being normally held down by the restoring spring 61. Whenever the piston 60 is forced upward by the inlet air pressure, the port 59 is shifted above the sealing O-ring 65 opposite the port 77 in sleeve valve 33 and in communication therewith and with the port 83, whenever the sleeve valve 33 is rotated to that particular position to shift the port 77 above the sealing O-ring 32. The annular groove or recess 57 around the inner diameter of sleeve valve 33 enables the piston port 59 to be effective to exhaust the air through port 77 regardless of the rotated position in which the piston 60 in the sleeve valve 33 may be placed by the rotation of the sleeve valve.

Figure 11:
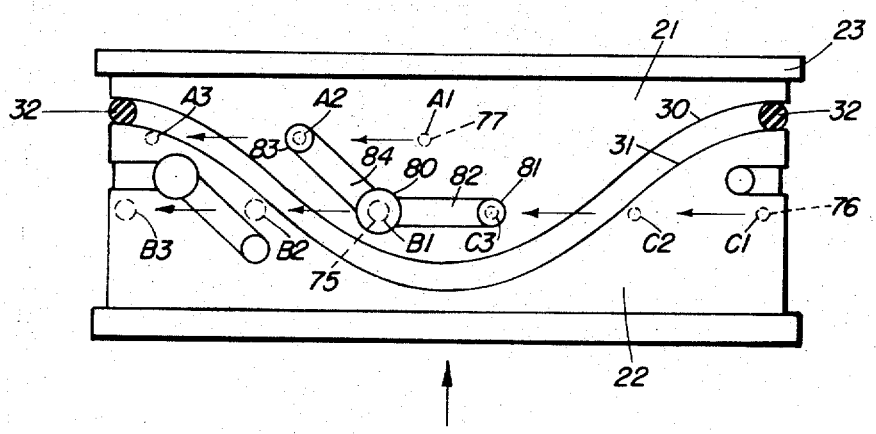
FIG. 11 is a diagrammatic representation of the sequence of operation of the retainer valve.

Referring now to FIG. 11, this diagrammatically indicates the various positions of the ports, both in the sleeve valve and the tubular bushing, in each of the three different positions of the operating handle 12. The tubular bushings 21 and 22 have both been laid out lineally and it will be assumed that the sleeve valve 33, not indicated here, but with its ports shown as dotted circles, is shifted or moved to the left and behind the tubular bushings. The three different positions of port 77 in the sleeve valve are indicated as A–1, A–2 and A–3. Port 75 is indicated at its different positions at B–1, B–2 and B–3 while port 76 is shown at C–1, C–2 and C–3. Whenever any of the ports 75, 76 and 77 are moved together by the sleeve valve to the left and behind the lower tubular sleeve 22, and below the sealing O-ring 32, they will be blocked or ineffective whereas when they are moved into position behind the ports 80, 81 and 83, they will be in communication with the large port 80 to exhaust position through body opening 70.

DESCRIPTION OF THE OPERATION

Assume now that in the normal operation of a freight car connected in a train on a straight level run and with the brake pipe charged with air pressures of approximately 70 p.s.i., then each retainer valve will be set so that the handle 12 is in the vertical or position EX as shown in FIG. 2. The air brake pipe connection leading from the usual AB control valve to the retainer valve is accordingly provided with a full direct and unrestricted exhaust path through the retainer valve over a flow path including the inlet connection 55, ports 75, 80, and 70, and outward through the expanded dirt guard 9 and the exhaust opening 8. At this time the piston 60 is also forced upward permitting only minor leakage through port 59 above sealing O-ring 65 without effect.

Referring again to FIG. 11, the port 77 in position A–1 is rendered ineffective and partially blocked by bushing 21, while port 76 in position C–1 is partially blocked by bushing 22. As pointed out, port 75 is now in the normal position B–1 and exhausts directly through port 80. In other words, the ports 75 and 77 are downstream from the sealing ring 32 and therefore effective, but port 77 is not sealed entirely and no significant amount of air can pass through this port and is considered only minor leakage. Port 76 being upstream is at this time ineffective. In the foregoing normal position of handle 12, it is seen that the retainer valve does not interfere in any manner with the regular operation of the AB control valve in the control of the braking equipment on the railway car.

When the train is operating in mountainous country and long descending grades are encountered, the brakes are often cycled during the descent, or a light brake application is retained at all times. The retainer valves are accordingly all set with their handles 12 in the HP or high pressure retaining position. In this rotated position of the handle, a slow reduction of the air pressure takes place until a pressure drop to 20 p.s.i. is reached. That amount of air pressure is retained or conserved in the brake cylinders as the brakes are being cycled, so that skidding and locking of the car wheels are prevented and sufficient braking pressure is provided at the bottom of the grade for straight runs. In this second position of the retaining valve handle handle 12, the piston 60 will be initially forced upward so that a slow gradual reduction of the air pressure is produced from the original high 50 p.s.i. which it is intended to be retained in the braking system.

The path of this air reduction or gradual leak through the valve includes the inlet 55, port 58 and restricted port 59, in the piston 60, annular slot 57 and into the port 77 in sleeve valve 33. Port 77 has been rotated opposite port 83 in tubular bushing 21 and therefore the air passes outward through port 83, through the slot 84 and ports 80 and 70, to the exhaust opening 70. As seen in FIG. 11 the port 77 has been shifted from position A—1 to A—2 to provide the above restricted flow path while port 76 is now rendered ineffective and blocked off at C—2 and port 75 at B—2, both below the sealing O-ring 32 in bushing 22. In other words, ports 75 and 76 are now located upstream and therefore subject to balanced pressures and not effective, while port 77 is downstream and effective.

When the braking pressure has been reduced to a value of 20 p.s.i. the piston 60 is forced downward by its spring 61, so that the port 59 is shifted below the sealing O-ring, 65, thereby shutting off air flow through port 77 and port 83. The port 77 now being positioned at A—2, and blocked by sealing O-ring 65, no air can pass through slot 84, and since port 80 is also blocked at this time at B—2, and port 76 at C—2, no air can escape anywhere from the valve. The 20 p.s.i. is therefore retained int he brake pipe as long as the operating handle 12 is in the HP position. This action also enables the air reservoirs to be recharged without losing braking effort as the train continues its downgrade run.

Under certain conditions and at the option of the train operator when a particular type of long downgrade and long train is present, a gradual slow air leakage is desirable so that the air brake line and brake cylinder can be recharged during the descent without going into release position. This slow leakage is therefore maintained at all times as the brakes are being cycled. This SD position is of particular value in grade operations since in many places it use makes it unnecessary to position the retainer valve at the top and bottom of the grade. The valve handle 12 is accordingly rotated to the third or SD position, thereby rotating the sleeve valve 33 so that port 76 is placed in communication with port 81 in the tubular bushing 21. Port 81 connects with slot 82 and this in turn with port 80 and exhaust port 70 to the outlet 8. The port 76 is sized so that a slow gradual dissipation of the air pressure takes place. Referring to FIG. 11, in the above described position of the retainer valve, port 76 is shown positioned at C—3 while port 77 is at A—3 and port 75 at B—3; both the latter ports being blocked off by the tubular bushing 22 and below the sealing ring 32. Ports 75 and 77 being on the upstream side are not now effective while port 76 downstream is effective to pass the air at the restricted rate.

In each of the positions in which the handle 12 has been placed it is snap-locked so that vibration and shocks during train movements cannot disturb the handle from its set position.

According to present regulations of the Association of American Railroads, the retainer valve must be calibrated and function to permit a blow down from a 435 cubic inch volume testing reservoir with an initial charge of 80 p.s.i., for each of the three different positions to which the retainer valve is set, and in the time interval specified as follows:

(1) Direct Exhaust (DE) from 70 to 10 p.s.i. in not more than 3 seconds.

(2) High Pressure Retain (HP) from 60 to 40 p.s.i. in 33 to 43 seconds.

(3) Slow Direct Exhaust (SD) from 60 to 40 p.s.i. in 17 to 22 seconds.

In the second (HP) position the air pressure in the brake cylinder shall reduce to and be retained at the piston valve closure point at not less than 16 p.s.i. or more than 22 p.s.i.

The ports in the sleeve valve 33 and the tubular sleeve 20 are bored and sized to provide the above conditions and are therefore in accordance with the above AAR standard regulations. As a preferred example the opening in port 75 is .187 inch, in port 76 .032 inch, and in port 77 .062 inch. The size of the opening in port 77 however is not controlling since the port 59 in the piston 60 is .025 inch. In the tubular bushing 21 the size of the ports is of course much larger, port 80 being .312 inch and both ports 81 and 83 being .187 inch. The area of the slots 82 and 84 are sufficient so no air restriction takes place in these passages.

The retainer valve made according to the invention meets all the above AAR specifications and functions in a highly reliable and satisfactory manner in all respects.

While a particular embodiment has been shown and described, it is not intended to limit the same to details of construction set forth, but, instead, the invention embraces such changes, modifications and equivalents of the various parts and their relationships as come within the purviews of the appended claims.

It will be understood that the location of the parts in relation to the cars can be varied. Whereas, in FIGS. 1, 3, 4, 5, 7 and 9, the axis of the structure is indicated as upright, and I have described the structure in terms of top and bottom, it will be understood that, in use, the casing 5 is most commonly applied to a car with its axis horizontally disposed. Therefore, where I have used the term "Top and Bottom" in describing various parts of the device, no limitation is intended, and this language is merely for convenience in description.

I claim:

1. A retainer valve for railroad cars comprising a cylindrical hollow casing having a rotatable cover plate enclosing the top end and an air inlet opening connection at the bottom end, a rotatable sleeve valve within said hollow casing, said sleeve valve being attached at one end to said cover plate and rotatable therewith, said hollow casing having a side exhaust opening therein, said sleeve valve having a plurality of different capacity side air ports therein each adapted to establish communication with said body exhaust opening as said sleeve valve is rotated to different positions within said hollow casing, and a piston axially slidable within said sleeve valve responsive to air pressure from said air inlet, said piston having a side air port therein adapted to communicate with one of said sleeve valve air ports.

2. A retainer valve for railroad cars comprising a cylindrical hollow casing having a rotatable cover plate enclosing the top end thereof, said hollow casing having an air inlet opening at the bottom end and a side exhaust opening, a rotatable sleeve valve within said hollow casing, said sleeve valve being closed at the top end and open at the bottom end, said sleeve valve being attached at the top end to said cover plate and rotatable therewith to different positions, a tubular bushing within said hollow casing and surrounding said sleeve valve, said tubular bushing being fixed in said hollow casing and in engagement with the side walls of said hollow casing and said sleeve valve, a cup-shaped piston axially slidable within said sleeve valve, said sleeve valve and said tubular bushing each having a plurality of air ports therein adapted to communicate with one another and said casing exhaust opening when said sleeve valve member is rotated to different positions by said cover plate, and an O-ring seal arranged obliquely in said tubular bushing between said sleeve valve and said hollow casing, said tubular bushing being constructed of two identical parts, the inner ends of which abut said O-ring on opposite sides thereof and the outer ends being supported at opposite ends of said hollow casing.

3. A retainer valve for railroad cars comprising a cylindrical hollow casing having a rotatable cover plate enclosing the top end thereof and an air inlet opening at the bottom end, and operating handle on said cover for rotating the same to a plurality of different positions on said body, a tubular bushing non-rotatable within said hollow casing, a sleeve valve rotatable within said tubular bushing, said sleeve valve being attached to said cover plate and rotatable therewith within said tubular bushing, a cup-shaped piston axially slidable within said sleeve valve, said hollow casing having a side air exhaust opening therein, said tubular bushing having a plurality of different capacity side air ports each communicating with said hollow casing exhaust opening, said sleeve valve having a plurality of different capacity side air ports therein, each adapted to be moved into communication with the corresponding air ports in said tubular bushing whenever said operating handle is operated to rotate said sleeve valve to a different position, said piston having a side air port therein adapted to communicate with one of said side air ports in said sleeve valve whenever air pressure of a predetermined value is present at said bottom air inlet, and a spring for said piston opposing said air pressure.

4. A retainer valve for railroad cars comprising a cylindrical casing having a rotatable cover plate enclosing the top end thereof and an air inlet opening at the bottom end, an operating handle on said cover for rotating the same to at least three different positions on said casing, a tubular bushing being non-rotatable within said hollow casing, a sleeve valve rotatable within said tubular bushing, said sleeve valve being attached to said cover plate and rotatable therewith within said tubular bushing, a piston axially slidable within said sleeve valve, said hollow casing having a single exhaust air opening therein, said tubular bushing having at least three air ports therein in communication with said hollow casing exhaust air opening, said sleeve valve having at least three air ports therein each adapted to be placed in communication with a different one of said tubular bushing air ports whenever said operating handle is actuated to rotate said sleeve valve to a different one of its three positions, said piston having air passage means therein adapted to communicate with one of said sleeve valve air ports whenever said piston is moved responsive to air pressure from said air inlet of a predetermined value, a spring for said piston opposing said air pressure, an O-ring seal in said tubular bushing between said hollow casing and said sleeve valve, and a second O-ring seal between said sleeve valve and said piston.

5. A retainer valve for railroad cars comprising a cylindrical hollow casing having a top cover plate and a bottom air inlet opening, an operating handle on said plate rotatable to at least three different positions, a tubular bushing fixed within said hollow casing, a sleeve valve rotatable within said tubular bushing, said sleeve valve being attached to said operating handle and rotatable thereby, said hollow casing having a single air exhaust port therein, said tubular bushing having at least three air ports therein in communication with said hollow casing air exhaust port, said sleeve valve having at least three air ports therein each adapted to be placed in communication with one of said air ports in said tubular bushing whenever said operating handle is actuated to rotate said sleeve valve to a different one of its positions, a piston axially slidable within said sleeve valve, said piston having air passage means therein adapted to communicate with one of said sleeve valve air ports whenever said piston is moved responsive to air pressure from said air inlet, a restoring spring for said piston opposing said air pressure, and an oblique sealing ring in said tubular bushing arranged between said hollow casing and said sleeve valve for sealing off communication between said air ports and said air exhaust port, except the port associated with the position to which said operating handle has rotated said sleeve valve.

6. In a retainer valve for railroad use, a hollow valve body having an air inlet at the bottom end, a side outlet, and an operating handle at the top end, a hollow rotary sleeve valve inside said valve body attached to said operating handle and adapted to be rotated by said handle into each of several different positions, said sleeve valve having a plurality of air ports extending through the sides thereof, a tubular bushing surrounding said sleeve valve and arranged between the sleeve valve and the inner walls of said valve body, said tubular bushing having a plurality of air ports extending through the sides thereof and in communication with said side outlet, certain of the air ports in said sleeve valve being placed in communication with certain of the air ports in said tubular bushing in each rotated position of said sleeve valve, a spring pressed piston reciprocal in said sleeve valve responsive to air pressure from said inlet, said piston controlling one of said air ports in said sleeve valve responsive to a specific air pressure valve, and a sealing ring obliquely arranged in said tubular bushing and serving as an air seal between said sleeve valve and the inner walls of said valve body, said sealing ring arranged to permit only certain of said air ports between said sleeve valve and tubular bushing to be in communication with each other in each rotated position of said sleeve valve while sealing off the remaining air ports, and a second O-ring seal between said sleeve valve and said piston.

7. The retainer valve as claimed in claim 6, in which the operating handle is frictionally locked in each of its positions by spring pressed detent pins arranged in the sleeve valve engaging recesses in a ring supported in the valve body.

8. The retainer valve as claimed in claim 6, in which the ports in the sleeve valve are each of a different size and are spaced around the sleeve valve at different locations in the sleeve valve.

9. The retainer valve as claimed in claim 6, in which the side outlet is provided with a dust and insect guard comprising a flexible disc around the air outlet having normally closed slits therein which are opened responsive to air flow through said outlet.

10. In a retainer valve for use on railroad cars, a hollow valve body having an air inlet on the bottom end, a side exhaust outlet, and an operating handle at the top end, a rotatable sleeve valve in said valve body attached to said operating handle and adapted to be rotated thereby into each of several different positions, said sleeve valve having air ports extending through the sides thereof, a tubular bushing surrounding said sleeve valve and fixedly supported between said sleeve valve and the inner walls of said valve body, said tubular bushing having air ports extending through the sides thereof and in communication with said side outlet, said sleeve air ports being placed in communication with said tubular bushing air ports in each of the different rotated positions of said sleeve valve, and an O-ring supported obliquely in said tubular bushing and serving as a seal between the outer wall of said sleeve valve and the inner wall of said valve body, said O-ring arranged so that only one of said air ports in said sleeve valve and tubular bushing is in communication with said side outlet in each of the rotated positions of said sleeve valve, while the remaining air ports are sealed off, said tubular bushing being constructed of two identical parts, the inner ends of which abut said O-ring on opposite sides thereof and the outer ends being supported on opposite ends of said valve body.

11. The retainer valve as claimed in claim 10, in which the tubular bushing is composed of two identical parts, the inner ends of which are obliquely shaped and in abutting relationship with the O-ring so that the O-ring serves to seal both on the inner surface wall and the outer surface wall of the tubular bushing.

12. The retainer valve as claimed in claim 10, in which a spring pressed piston is slidable within said sleeve valve and has air passage means therein adapted to be placed in communication with one of said sleeve valve air ports when forced upward at normal air pressures and at a predetermined lower pressure the piston air passage means is sealed off by the piston being forced downward.

13. The retainer valve as claimed in claim 10, in which there are at least three air ports in the sleeve valve each of different size and capacity and each is located at a different position around the sleeve valve, and in which there are at least three air ports in tubular sleeve of different size and capacity and located at different positions around the tubular bushing.

14. The retainer valve as claimed in claim 10, in which one of the sleeve valve air ports provides a full direct flow path to the side exhaust outlet; a second sleeve valve air port retains a predetermined air pressure in the air inlet; and a third sleeve valve air port provides a continuous slow restricted leakage to said exhaust outlet.

15. A retainer valve for railroad cars which comprises an outer casing, a rotatable indicator plate and a handle therefor, an air inlet opening in said casing, an air exhaust opening in said casing, a fixed bushing in said casing, a rotatable sleeve valve within said fixed bushing, secured to and movable in unison with said indicator plate, and means movable within said sleeve valve responsive to air pressure from said air inlet, a plurality of ports in said fixed sleeve, and in said rotatable sleeve valve, said ports being of different capacities, adapted thereby, in response to rotation of said valve sleeve, to vary the flow of air from said air inlet opening to said air exhaust opening, and an O-ring seal arranged obliquely between said outer casing and said rotatable sleeve, said fixed bushing comprising two identical cylindrical parts abutting said O-ring at their inner ends and being supported in said outer casing at their outer ends.

16. The structure of claim 15 characterized in that the means movable within the sleeve valve responsive to air pressure from the air inlet include air passage means adapted, in response to movement of said means, to communicate selectively with one or more of the ports in the rotatable sleeve valve.

*17. A retainer valve for railroad use, including a cylindrical hollow casing having an air inlet at one end thereof, an exhaust opening in said casing, an operating handle at the other end of said casing, a rotatable sleeve valve within said hollow casing, said sleeve valve being attached at one end to said operating handle and rotatable therewith, said sleeve valve having a plurality of different capacity air ports therein, each adapted to establish communication with said exhaust opening as said sleeve valve is rotated to different positions within said hollow casing, and a piston axially slideable within said sleeve valve in response to air pressure at said inlet, a spring urging said piston toward said inlet, movement of said piston adapted to establish communication between said air inlet and one of said sleeve valve air ports.*

*18. The structure of claim 17 further characterized by and including a tubular bushing within said casing, said sleeve valve being movable within said bushing, said bushing comprising two parts, separated by an obliquely arranged seal.*

References Cited

The following references, cited by the Examiner, are of record in the patented file of this patent or the original patent.

UNITED STATES PATENTS

| | | | |
|---|---|---|---|
| 1,608,120 | 11/1926 | Price | 137—625.32 |
| 2,186,791 | 1/1940 | Willgoos | 137—614.17 |
| 2,621,886 | 12/1952 | Mueller | 137—625.47 |
| 3,139,903 | 7/1964 | Lonn | 251—207 |

ROBERT G. NILSON, Primary Examiner

U.S. Cl. X.R.

303—79